US010955294B2

United States Patent
Podmore et al.

(10) Patent No.: US 10,955,294 B2
(45) Date of Patent: Mar. 23, 2021

(54) OPTICAL SENSOR FOR TRACE-GAS MEASUREMENT

(71) Applicant: Honeywell International Inc., Morris Plains, NJ (US)

(72) Inventors: Hugh Podmore, Ottawa (CA); Alan Scott, Arnprior (CA); Glen A. Sanders, Scottsdale, AZ (US); Sudip Mukhopadhyay, Berkeley, CA (US)

(73) Assignee: Honeywell International Inc., Charlotte, NC (US)

( * ) Notice: Subject to any disclaimer, the term of this patent is extended or adjusted under 35 U.S.C. 154(b) by 86 days.

(21) Appl. No.: 16/363,864

(22) Filed: Mar. 25, 2019

(65) Prior Publication Data

US 2020/0249092 A1     Aug. 6, 2020

Related U.S. Application Data

(60) Provisional application No. 62/800,712, filed on Feb. 4, 2019.

(51) Int. Cl.
     *G01J 3/45*      (2006.01)
     *B64C 39/02*     (2006.01)
     *G01J 3/02*      (2006.01)

(52) U.S. Cl.
     CPC .............. *G01J 3/45* (2013.01); *B64C 39/024* (2013.01); *G01J 3/0205* (2013.01)

(58) Field of Classification Search
     CPC .. G01J 3/45; G01J 3/4531; G01N 2021/1793; B64C 39/024
     See application file for complete search history.

(56) References Cited

U.S. PATENT DOCUMENTS

| | | |
|---|---|---|
| 5,473,162 A | 12/1995 | Busch et al. |
| 6,862,535 B2 | 3/2005 | Binder |
| 7,115,893 B1 | 10/2006 | Wood |
| 7,259,856 B2 | 8/2007 | Kachanov et al. |
| 7,595,887 B2 | 9/2009 | Spartz et al. |
| 8,018,597 B2 | 9/2011 | Scott |

(Continued)

FOREIGN PATENT DOCUMENTS

| | | |
|---|---|---|
| EP | 2136191 A1 | 12/2009 |
| EP | 3270126 A1 | 1/2018 |

(Continued)

OTHER PUBLICATIONS

Extended Search Report from counterpart European Application No. 20154438A, dated Jul. 7, 2020, 8 pp.

(Continued)

*Primary Examiner* — Michael A Lyons
(74) *Attorney, Agent, or Firm* — Shumaker & Sieffert, P.A.

(57) ABSTRACT

A system for detecting trace-gas includes an optical sensor mounted on a vehicle and processing circuitry. The optical sensor includes a plurality of interferometers configured to collect samples. The processing circuitry is configured to generate a digitized signal based on the samples, apply a forward Fourier-transform on the digitized signal to generate spectrum information for the plurality of interferometers, and determine a gas species has been detected using one or more intensity of absorption features of the spectrum information corresponding to the gas species from the spectrum information.

20 Claims, 12 Drawing Sheets

(56) References Cited

U.S. PATENT DOCUMENTS

| | | |
|---|---|---|
| 8,587,787 B2 | 11/2013 | Reyes et al. |
| 9,638,630 B2 | 5/2017 | Eddy et al. |
| 9,766,099 B2 | 9/2017 | Pechstedt |
| 9,810,627 B2 | 11/2017 | Huang et al. |
| 9,964,396 B1 | 5/2018 | Scott et al. |
| 10,094,215 B2 | 10/2018 | Bright |
| 10,094,773 B2 | 10/2018 | Myshak et al. |
| 10,113,956 B1 | 10/2018 | Li et al. |
| 10,386,237 B2 | 8/2019 | Hu et al. |
| 2007/0077595 A1 | 4/2007 | Koo et al. |
| 2010/0245831 A1* | 9/2010 | Okamoto ............... G01J 3/4531 356/451 |
| 2011/0181885 A1 | 7/2011 | Hsu et al. |
| 2012/0050744 A1* | 3/2012 | Takada ................. G01J 3/4532 356/451 |
| 2012/0098924 A1* | 4/2012 | Busch .................... G06T 7/194 348/36 |
| 2014/0264031 A1 | 9/2014 | Fermann et al. |
| 2017/0097302 A1 | 4/2017 | Kreitinger et al. |
| 2017/0227399 A1* | 8/2017 | Hu ....................... G01J 3/4531 |
| 2018/0052100 A1 | 2/2018 | Babin et al. |
| 2018/0128592 A1 | 5/2018 | Scott et al. |
| 2019/0353524 A1 | 11/2019 | Ifarraguerri et al. |
| 2020/0003620 A1 | 1/2020 | Deck |

FOREIGN PATENT DOCUMENTS

| | | |
|---|---|---|
| JP | 2006234810 A | 9/2006 |
| WO | 2017/201548 A1 | 11/2017 |
| WO | 2018/175524 A1 | 9/2018 |

OTHER PUBLICATIONS

Schuyler et al., "Unmanned Aerial Systems for Monitoring Trace Tropospheric Gases," MDPI, Atmosphere Journal, Oct. 23, 2017, 16 pp.

Villa et al., "An Overview of Small Unmanned Aerial Vehicles for Air Quality Measurements: Present Applications and Future Prospectives," MDPI, Sensors Journal, Jul. 12, 2016, 29 pp.

Kita et al., "High-performance and scalable on-chip digital Fourier transform spectroscopy," Nature Communications 9, article No. 4405, Oct. 23, 2018, 7 pp.

Podmore et al., "A compressive-sensing Fourier-transform spectrometer chip using subwavelength grating waveguides," Optics Letters, Jan. 18, 2017, 4 pp.

U.S. Appl. No. 16/578,135, by Honeywell Aerospace Inc. (Inventors: Podmore et al.), filed Sep. 20, 2019.

Response to Search Report dated Jul. 7, 2020, from counterpart European Application No. 20154438.4, filed Jul. 23, 2020, 11 pp.

Lenzner et al., "Concerning the Spatial Heterodyne Spectrometer," Optics Express, vol. 24, No. 2, Jan. 25, 2016, 11 pp.

\* cited by examiner

US 10,955,294 B2

OPTICAL SENSOR FOR TRACE-GAS MEASUREMENT

PRIORITY CLAIM

This application claims the benefit of U.S. Provisional Patent Application No. 62/800,712, filed Feb. 4, 2019, the entire content of which is incorporated herein by reference.

TECHNICAL FIELD

This disclosure relates to systems for gas detection, specifically, gas leak detection.

BACKGROUND

Vehicles, such as, for instance, Unmanned Aerial Vehicles (UAVs) have the potential to dramatically improve the process of inspecting various inspection targets. For instance, a UAV may be able to more quickly access large geographical areas compared to a person walking or using land vehicles, which may reduce risk to human beings.

SUMMARY

In general, this disclosure relates to techniques that improve detection systems for detecting gas. For example, techniques of this disclosure may reduce a deployment cost and/or improve an accuracy of measurement when using Unmanned Aerial Vehicles (UAVs) to identify a gas leak.

In one example, a system for detecting trace-gas includes an optical sensor and processing circuitry. The optical sensor is mounted on a vehicle, the optical sensor comprising a plurality of interferometers configured to collect samples. The processing circuitry is configured to: generate a digitized signal based on the samples, apply a forward Fourier-transform on the digitized signal to generate spectrum information for the plurality of interferometers, and determine a gas species has been detected using one or more intensity of absorption features of the spectrum information corresponding to the gas species from the spectrum information.

In another example, a method of detecting trace-gas includes: collecting, by a plurality of interferometers, samples from a plurality of interferometers of an optical sensor mounted on a vehicle, generating, by processing circuitry, a digitized signal based on the samples, applying, by the processing circuitry, a forward Fourier-transform on the digitized signal to generate spectrum information for the plurality of interferometers, and determining, by the processing circuitry, a gas species has been detected using one or more intensity of absorption features of the spectrum information corresponding to the gas species from the spectrum information.

In another example, a system for detecting trace-gas includes a UAV and processing circuitry. The UAV includes an optical sensor mounted on the UAV, the optical sensor comprising a plurality of interferometers configured to collect samples. The processing circuitry is configured to: generate a digitized signal based on the samples, apply a forward Fourier-transform on the digitized signal to generate spectrum information for the plurality of interferometers, and determine a gas species has been detected using one or more intensity of absorption features of the spectrum information corresponding to the gas species from the spectrum information.

In one example, a computer-readable data storage medium includes instructions that, when executed, cause a computing system to: generate a digitized signal based on the samples collected by a plurality of interferometers of an optical sensor mounted on a vehicle, apply a forward Fourier-transform on the digitized signal to generate spectrum information for the plurality of interferometers, and determine a gas species has been detected using one or more intensity of absorption features of the spectrum information corresponding to the gas species from the spectrum information.

In another example, a device for detecting trace-gas includes: means for collecting samples, means for generating a digitized signal based on the samples, means for applying a forward Fourier-transform on the digitized signal to generate spectrum information, and means for determining a gas species has been detected using one or more intensity of absorption features of the spectrum information corresponding to the gas species from the spectrum information.

The details of one or more examples of the disclosure are set forth in the accompanying drawings and the description below. Other features, objects, and advantages will be apparent from the description, drawings, and claims.

DETAILED DESCRIPTION

Figure 1:
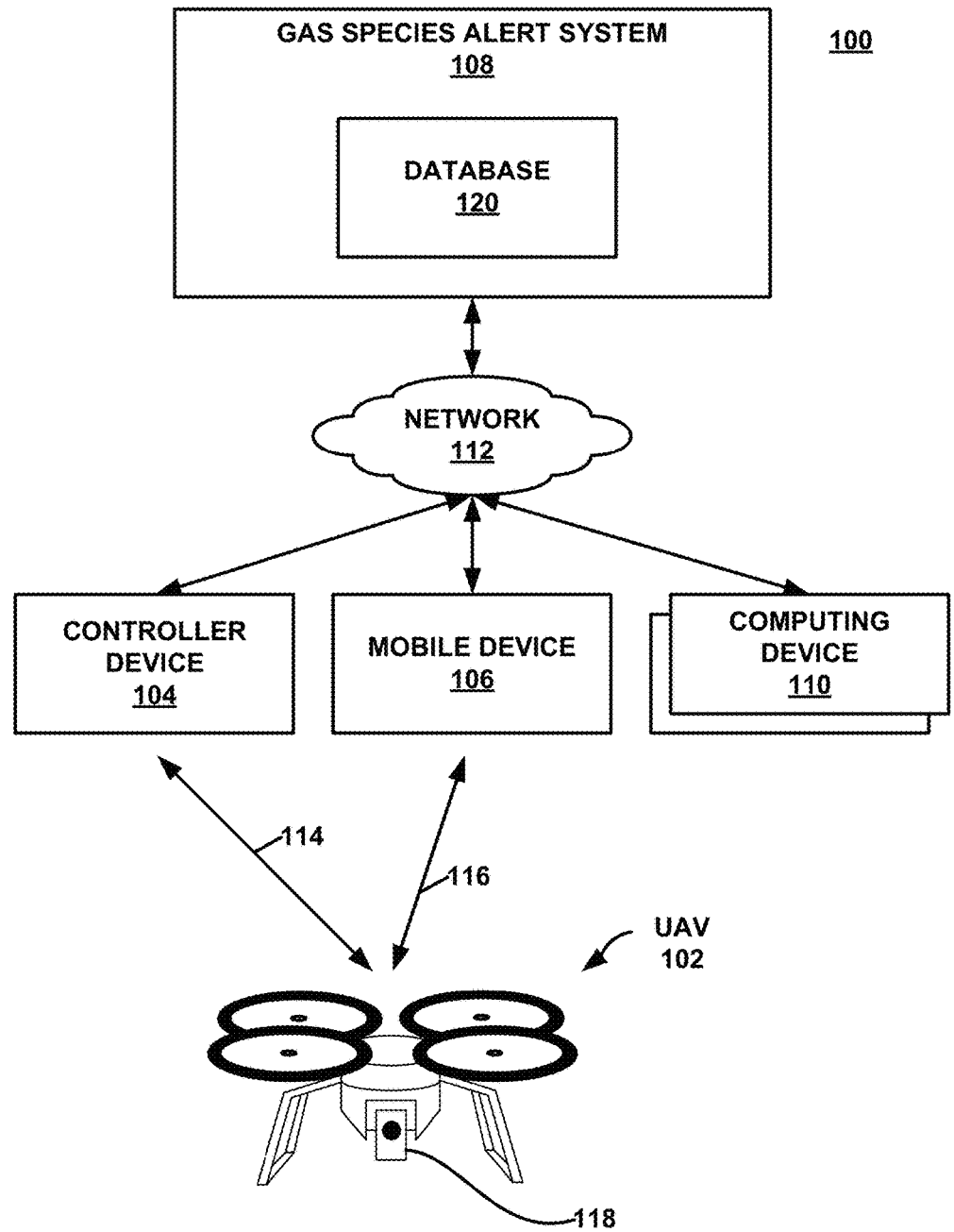
FIG. 1 is a conceptual diagram showing an example system for detecting a gas leak using an unmanned aerial vehicle (UAV), which may be configured to implement the techniques of this disclosure.

Some leak detection services rely on hand-held laser sighted guns in order to find gas (e.g., methane) leaks. These systems may be heavy and require manual localized inspection with heavy overhead. Such systems may include instruments offering "yes" or "no" readouts without quantification of data and may be difficult to scale up to a product that would cover an entire facility or pipeline network. Such leak detection services that rely on hand-held laser sighted guns may not be suitable for some applications (e.g., in a refinery).

Some systems may use a highly mobile platform such as a drone or aircraft configured with gas detection technologies that are based on gas-draw sensors. However, a downdraft of propellers of such systems may disperse trace gases that gas-draw sensors are measuring, which may impact accuracy of measurements of the gas-draw sensors. As such, gas-draw sensors may be arranged outside of the downdraft of the propellers.

For example, some systems may use high-sensitivity optical cavities performing cavity ring-down spectroscopy (CRDS). These techniques may use carefully polished and aligned optical cavities, which are expensive to produce and require a large amount of touch time to assemble. CRDS techniques may achieve a high level of measurement precision but the measurement location may be co-located with the drone in such a way that the downdraft of the drone may render the measurement meaningless.

This disclosure describes a miniaturized high-sensitivity optical instrument capable of measuring trace concentrations of gases (e.g., hazardous gases) at standoff distances (e.g. with physical separation from the drone). This instrument may allow for a highly mobile platform while overcoming hurdles associated with mounting in-situ gas-sniffers on drone platforms. The optical instrument described herein may represent an optical sensing scheme for miniaturized airborne applications (e.g. drones) that accomplishes remote-detection using integrated photonics. In contrast, sensor developments that have focused on conventional optics (e.g. cavity ring-down spectroscopy, direct-imaging, Fabry-Perot imagers) including lenses and mirrors may be difficult to scale towards a distributed sensor network-type application, due to the high cost of assembly for these components.

Moreover, the optical instrument described herein may be fabricated at wafer-scale, leveraging many developments made in photonic integrated circuits over the years. By taking advantage of wafer-scale fabrication, complex optical circuits generating very high spectral resolution (e.g., a driver of instrument precision) may be fabricated at very low cost, making the technology well-suited for distributed sensor networks such as fleets of drones compared to systems relying on hand-aligned high-sensitivity optical cavities performing cavity ring-down spectroscopy and to systems relying on Fabry-Perot imaging spectrometers, which may use high-precision optical cavities that are labor intensive for manufacturing and are generally not mass produced.

The optical instrument described herein may enable detection outside of a downdraft of the drone, a capability which may significantly improve measurement accuracy. Moreover, the optical instrument described herein may enable a reduction in cost of manufacturing the optical system through wafer-scale manufacturing of the most complex optical components compared to systems relying on carefully polished and aligned optical cavities.

FIG. 1 is a conceptual diagram showing an example system for detecting a gas leak using an unmanned aerial vehicle 102 (UAV 102), which may be configured to implement the techniques of this disclosure. In the example of FIG. 1, system 100 includes a UAV 102, a controller device 104, a mobile device 106, a gas species alert system 108 (referred to herein as "alert system 108"), one or more computing devices 110, and a network 112. In system 100, a UAV pilot may use controller device 104 to control a flight path of UAV 102. An inspector may use mobile device 106 to control sensors mounted on UAV 102 to perform an gas detection of an inspection target. Alert system 108 provides resources to support an end-to-end workflow for UAV-based gas detection. Users may use computing devices 110 to interact with alert system 108. Network 112 facilitates communication among controller device 104, mobile device 106, alert system 108, and computing devices 110.

Although shown as separate devices in FIG. 1, in other examples, the functionality of controller device 104 and mobile device 106 may be performed by a common device. In some examples, UAV 102 is sufficiently autonomous to avoid the need to have a pilot use a controller device, such as controller device 104, to navigate UAV 102 along a flight path. In instances where UAV 102 is 100% autonomous (or at least partially autonomous), UAV 102 may perform data collection with high repeatability and may be used for time series analysis that may build over a period of several weeks/months/years, etc. In some examples, however, UAV 102 may not be autonomous and/or may be controlled at least partially by a human operator. For instance, UAV 102 may be operated 100% manually (e.g., by a human being) or combination of manual control and autonomous flight.

UAV 102 is shown in FIG. 1 as a quadcopter, but UAV 102 may be any type of UAV including, but not limited to, a rotorcraft, a fixed wing aircraft, compound aircraft such as tilt-rotor, X2 and X3, an aerostat, or any other such type of UAV including all vertical take-off and landing (VTOL), tail-sitter, etc. UAV 102 may be configured to fly with various degrees of autonomy. In some examples, UAV 102 may be under the constant, or near constant, control of a user of controller device 104. In other examples, controller device 104 may deliver a mission, including a flight plan, to UAV 102, and onboard processing circuitry of UAV 102 may be configured to execute the mission, with little or no additional user input. In some examples, UAV 102 may use LIDAR for collision avoidance.

Although the techniques of this disclosure are not limited to any particular type of UAV, UAV 102 may, for example, be a relatively small, low altitude, and low-speed UAV, where in this context, small corresponds to under 100 pounds (lbs), low altitude corresponds to operating altitudes less than 3000 feet above ground, and low air speed corresponds to air speeds less than 250 knots. Furthermore, it is contemplated that UAV 102 may have hovering capabilities, meaning UAV 102 may have the capability of remaining at an approximately constant location in the air.

In some examples, controller device 104, mobile device 106, and computing devices 110 each comprises a general-purpose device such as a laptop or desktop computer, a tablet computer, a cellular or satellite radio telephone, a smart phone, or another such device. In examples where controller device 104 is a general-purpose device, controller device 104 may be loaded with and configured to execute software designed to control UAV 102. In other examples, controller device 104 is a special-purpose device designed specifically for use in controlling UAV 102. In some examples, controller device 104 comprises a display screen that may display information, such as flight plan information, to a user. In some examples, controller device 104 communicates with alert system 108 to obtain and send data, such as flight plan data.

Controller device 104 communicates with UAV 102 via communication link 114. Communication link 114 may, for example, be a direct link through a radio communication protocol, such as WiFi, Bluetooth, ZigBee, a proprietary protocol, or any other suitable protocol. In other examples, communication link 114 is a network-based link where controller device 104 communicates with UAV 102 through one or more intermediary devices such as gateways, routers, switches, repeaters, or other such network devices.

In some examples, UAV 102 is configured to stream data to mobile device 106 in real-time or near real time via, for example, a wireless communication link 116. Mobile device 106 may also provide commands to UAV 102 via communication link 116. Communication link 116 may be implemented in a manner similar to communication link 114.

Alert system 108 comprises one or more computing devices. For example, alert system 108 may comprise one or more computing devices, such as a laptop or desktop computer, a tablet computer, a server device, or another such device. Alert system 108 may be loaded with and configured to execute software designed to provide resources to support an end-to-end workflow for UAV-based aerial inspections. Optical sensor 118 is mounted on UAV 102. Optical sensor 118 may include a telescope and interferometers capable of collecting samples for generating a digitized signal.

UAV 102 may perform trace-gas detection inspections of various types of inspection targets. For example, an inspection target may be a building, a dam, a solar panel array, a wind turbine, a monument, a bridge, a levee, a seawall, a pier, an antenna, a volcano, a pump station, an agricultural area, an electrical transmission tower, gas tanks, a gas pipeline, or another type of artificial or natural structure. In some examples, UAV 102 may perform a horizontal inspection, for example, by capturing samples while flying parallel to a surface of the earth. In some examples, UAV 102 may perform a vertical inspection, for example, by capturing samples while flying perpendicular to a surface of the earth. An example of a vertical inspection may include, but is not limited to, for example, an inspection of a chimney at a nuclear power plant.

In some examples, UAV 102 saves the samples on a Secure Digital (SD) card or other type of memory card, and additionally or alternatively may also transfer on-line to a cloud-based web server using 3G, 4G, 5G, Narrow Band-Internet of Things (NBIOT), or another wireless type of transmission technologies. In some examples, UAV 102 is equipped with one or more differential Global Navigation Satellite System (GNSS) devices to assist UAV 102 navigate to the aerial inspection data capture locations. For instance, UAV 102 may be equipped for real-time kinematics, which is a type of differential GNSS that may provide high positioning performance for UAV 102 in the vicinity of a base station. In some examples, accuracy of the GNSS devices may be within 1 centimeter. Additionally, or alternatively, UAV 102 may save a digitized signal that is based on the samples, spectrum information, and/or an indication of a gas species detected, to a SD card or other type of memory card, and additionally or alternatively may also transfer on-line to a cloud-based web server using 3G, 4G, 5G, Narrow Band-Internet of Things (NBIOT), or another wireless type of transmission technologies.

In the example of FIG. 1, alert system 108 may include a database 120. Database 120 may store information related to inspection projects. Database 120 may be implemented in various ways. For example, database 120 may comprise one or more relational databases, object-oriented databases, comma-separated value (CSV) files, or other types of databases. Database 120 may store one or more of samples captured by UAV 102, one or more digitized signals generated based on the samples, spectrum information generated using the one or more digitized signals, one or more gas species detected, a quantity of a gas species detected, and/or other information.

In accordance with one or more techniques described herein, optical sensor 118 may include interferometers configured to collect samples. In this example, processing circuitry may be configured to generate a digitized signal based on the samples, apply a forward Fourier-transform on the digitized signal to generate spectrum information for the plurality of interferometers, and determine a gas species has been detected (and a quantity of the gas species) using one or more intensity of absorption features of the spectrum information corresponding to the gas species from the spectrum information. In some examples, the processing circuitry is arranged within UAV 102. In some examples, the processing circuitry is arranged outside of UAV 102. For instance, the processing circuitry may be arranged at one or more of controller device 104, mobile device 106, computing device 110, gas species alert system 108, or another device. In some examples, the processing circuitry comprises a first processor arranged within UAV 102 and a second processor arranged outside of UAV 102.

System 100 may be configured to provide an automated end-to-end solution to detect trace-gas with help of aerial data collected as part of (periodic) aerial inspections. Specifically, for example, system 100 may be configured to include one or more of the following.

Optical sensor 118 may be a passive micro-photonic optical sensor, with high spectral resolution, for detection of trace (e.g. fugitive) gas emissions from industrial and agricultural sources. In some examples, optical sensor 118 may include a plurality of interferometers to collect the inverse Fourier-transform of the input optical spectrum. System 100 may reconstruct the collected inverse Fourier-transform of the input optical spectrum by the forward Fourier-transform of the collected intensities from each interferometer. Being a Fourier-transform spectrometer, system 100 may achieve greater optical signal-to-noise ratio than systems that do not rely on a Fourier-transform spectrometer.

Optical sensor 118 may collect the samples from the plurality of interferometers in quadrature (e.g., 180 degrees out-of-phase) or in three-phase-output (e.g., 120 degrees out-of-phase) in order to normalize the sampling points and correct for non-uniform illumination of an aperture, as well as phase shifts in each interferometer.

Optical sensor 118 may be fabricated on-chip, formed through planar waveguides (e.g., including or consisting of Silicon, Silicon Nitride, Silicon Oxynitride, Indium Phosphide, etc.) deposited on a substrate (e.g., Silicon, silicon dioxide, Germanium, etc.) in a dense configuration in order to enable wafer-scale manufacturing of the optical sensors.

Optical sensor 118, which may include a single optical chip or multiple optical chips in a stacked configuration. In some examples, each chip of multiple optical chips may be configured for detecting a gas species. In some examples, optical sensor 118 may operate in the infrared. In some examples, optical sensor may include multiple optical chips, with each chip being tuned, via arrangement of interferometers of optical sensor 118, to detect a particular gaseous species. That is, for example, interferometers may be arranged in a first chip of a plurality of chips arranged in a stacked configuration. In some examples, each chip of the plurality of chips is configured for detecting a gas species.

Optical sensor 118 may include a linear pixel array, a two-dimensional pixel array (e.g., in the case of a vertical stack of chips), and/or an on-chip detector (e.g., implanted directly into the waveguide layer) configured to read out (e.g., detect) optical signals collected by the sensor.

Optical sensor 118 may include an electrical readout circuit comprising of low noise electrical pre-amplifiers, analog-to-digital converters (ADCS). The electrical readout circuit may collect signals from the detector array and store the signals from the detector array in long-term memory as raw data for later processing. In some examples, the electrical readout circuit may load the signals from the detector array into short-term memory for immediate processing and store the signals from the detector array in long-term memory only a single gas concentration value (e.g., to reduce data and memory overhead).

Optical sensor 118 may be mounted on a manned or unmanned mobile aerial system including drones, aircraft, helicopters, urban air mobility systems, vertical takeoff and landing (VTOL), rotary aircraft, lighter-than-air vehicles, etc. UAV 102 may operate within visual line of sight of an operator, or beyond visual line of sight (BVLOS) of an operator (e.g. for inspection of extended or disperse sources).

System 100 may detect a single, or multiple gas species (e.g., water vapor, Methane, Hydrogen Sulfide, Carbon Monoxide, Carbon Dioxide, Phosphene, Benzene, NOx, SOx, etc.) in the range of 0-1000 ppm at a standoff distance of 0 meters to 100 meters from the source and a vertical distance (altitude) of 0 meters to 150 meters. For example, each chip of a plurality of chips may be configured to detect one of multiple gas species (e.g., water vapor, Methane, Hydrogen Sulfide, Carbon Monoxide, Carbon Dioxide, Phosphene, Benzene, NOx, SOx, etc.) with a minimum sensitivity in the range of 0-1000 ppm. In some examples, system 100 may detect a single, or multiple gas species at a standoff distance of greater than 1 meter (e.g., 1 meter to 150 meters) from the source. System 100 may perform measurements with a minimum input flux of 1.5 picowatts (pW), provided by reflected solar radiation System 100 may be used to proactively search for gas (e.g. through gradient descent towards local "hot-spots") or to retroactively provide industrial emergency response. System 100 may be used to provide site-wide coverage of hazardous gases and may provide immediate alerts as to the presence of hazardous or toxic gases to the site management through the industrial internet-of-things. System 100 may continuously refine the measurement accuracy, and expected leak locations through artificial intelligence and deep-learning in order to fully automate drone operation and data analytics.

System 100 may provide manual access to the data (e.g. through direct connection to a computer or tablet) and provides remote access to the data by uploading to the cloud, enabling the sensor to operate as part of the connected industrial internet-of-things. System 100, which may be a remote detection system, may operates at any mounting point on the mobile platform (e.g., UAV 102) with a direct line of sight to the emission source and is not constrained by turbulence (e.g. from rotor blades). System 100, which may be a remote detection system, is not constrained by the local speed of UAV 102 when tracking a dense emitter (e.g. can operate in high wind-speed environment).

System 100 may perform rapid plume reconstruction by assembly of a "point-cloud" of gas concentration measurements obtained by scanning the sensor in azimuth and elevation over the extent of the plume, this process may obviate the need for time-intensive "plume-circling" flights. For example, some systems may circle a plume to detect a gas species. However, system 100 may detect a gas species remotely using samples collected from measuring light reflected by the plume.

System 100 may operate with low power drawn directly from UAV 102 or using an internal battery—in order to enable long flights with minimal down time. In a low power mode drawing no more than 5.6 W, optical sensor 118 may operate in a high-power mode (e.g. in a high-temperature environment) drawing no more than 11.1 W. System 100 may store each point measurement collected with a geo-location tag in order to provide a 3-D map of trace gas concentrations (e.g., over a large facility or site).

Figure 6:
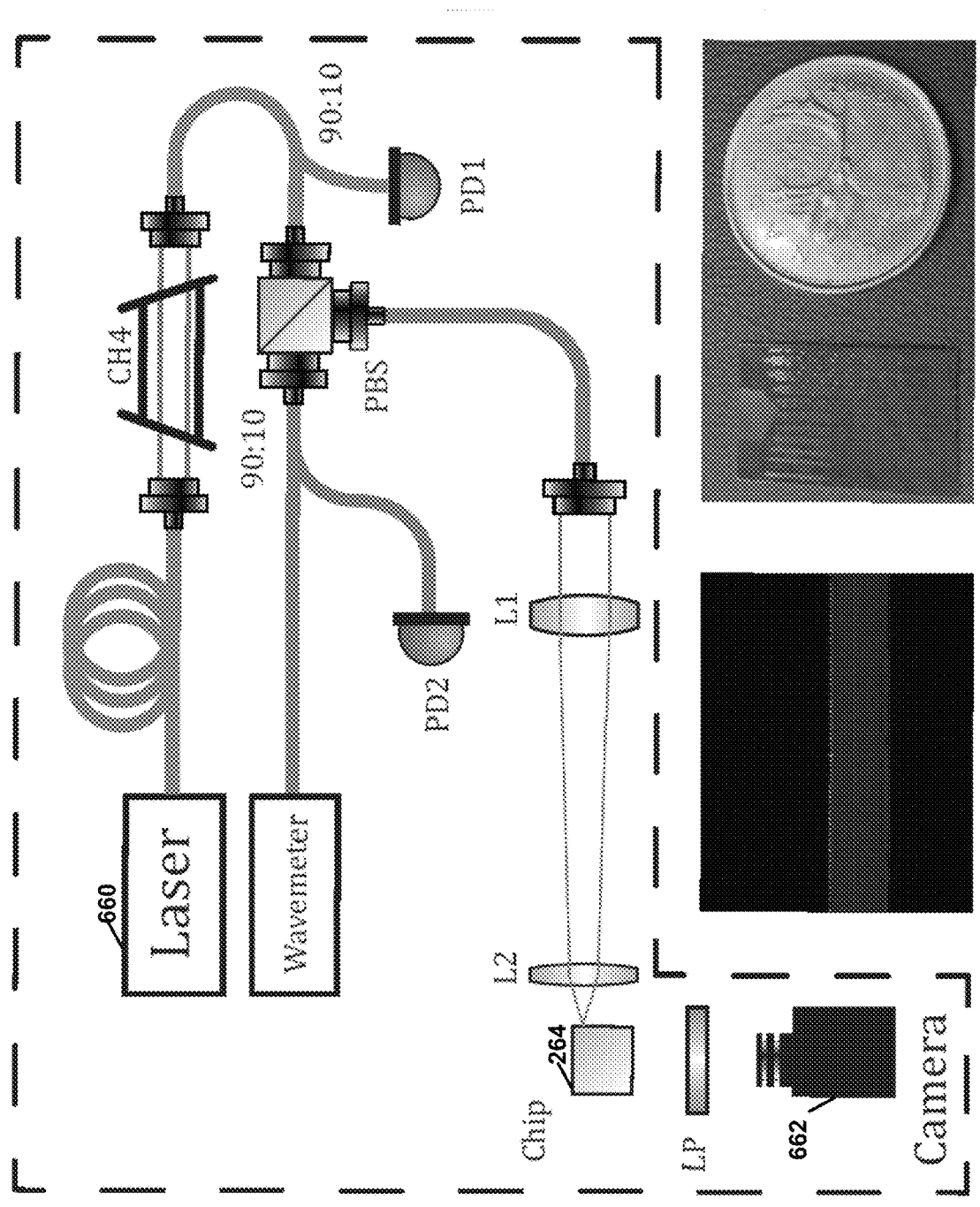
FIG. 6 is a conception diagram illustrating example an calibration scheme to generate a calibration matrix, in accordance with a technique of this disclosure.

System 100 may be calibrated once, during manufacturing, by a tunable laser collecting a "calibration map" or "matrix" of interferometer outputs as a function of wavelength which is then used for the retrieval of spectra from collected Fourier samples (see FIG. 6). System 100 may fit the payload mass requirements for a commercial small unmanned system (SUS).

While the example of FIG. 1 is described with reference to UAV 102 as a vehicle, in other examples, other vehicles may be used, for example, but not limited to, various types of land-based vehicles, water-based vehicles, space vehicles, and other types of aerial vehicles.

Figure 2:
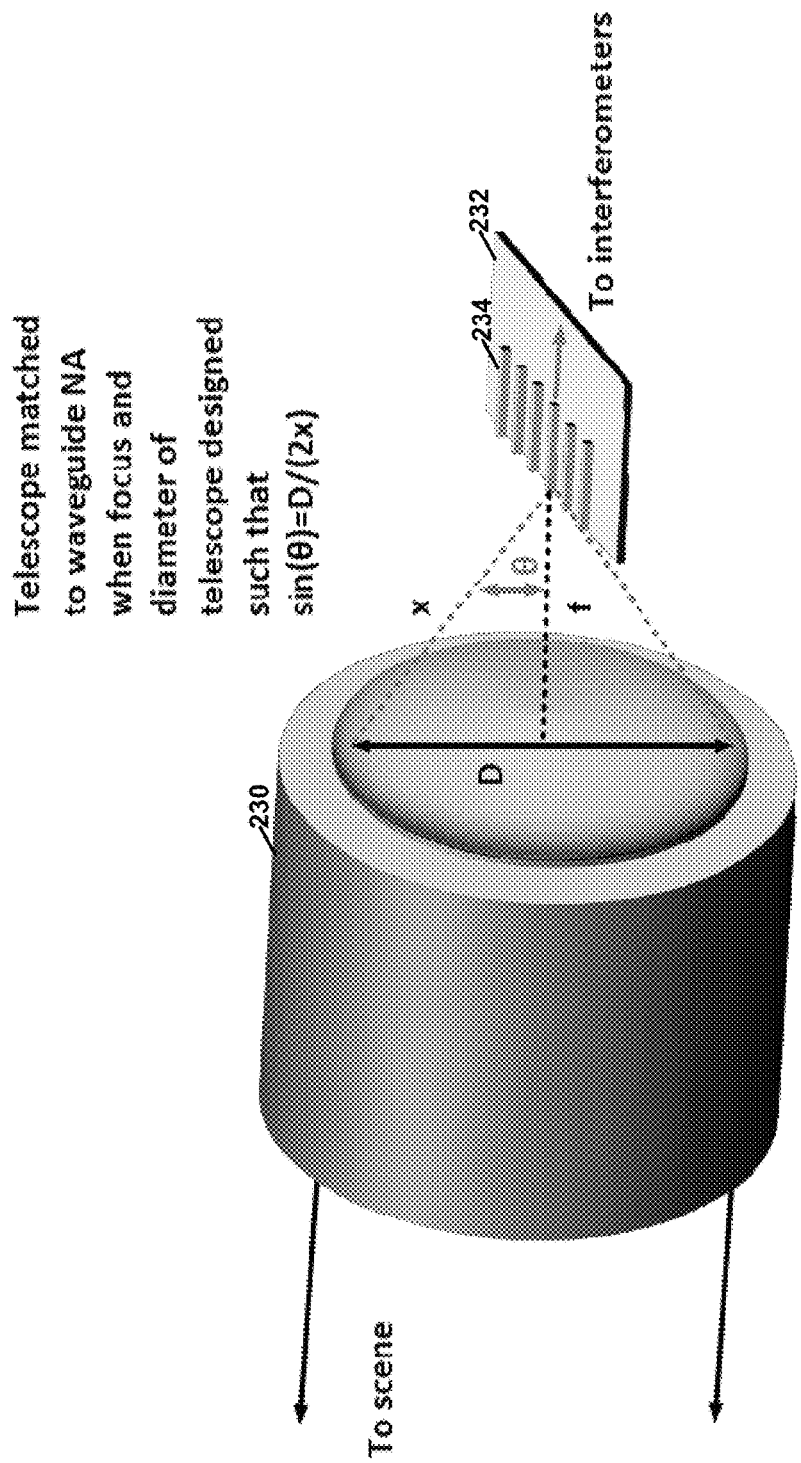
FIG. 2 is a conception diagram illustrating example telescope and interferometers, in accordance with a technique of this disclosure.

FIG. 2 is a conception diagram illustrating example telescope 230 and interferometers, in accordance with a technique of this disclosure. FIG. 2 shows a representative portion of chip 232 including input waveguides 234 which are laid out on top of a substrate of chip 232 (mechanical mounting features for the chip are not shown). Light enters telescope 230 from the scene of interest (left of page, not shown) and is focused onto the facets of waveguides 234.

In order to ensure optimum coupling to waveguides 234, a diameter of telescope 230 and a focal distance of telescope 230 may be chosen to match an inherent numerical aperture (e.g. "acceptance cone") of waveguides 234. For example, telescope 230 may be configured with a numerical aperture that corresponds (e.g., equals, matches, etc.) to a numerical aperture of the interferometers. More specifically, for instance, telescope 230 may be matched to waveguide numerical aperture when a focus and a diameter of telescope 230 designed such that $\sin(\theta)=D/(2\times)$. Once light has entered waveguides 234, the light passes to the rest of chip 232 and the interferometers. In some examples, the interferometers may be arranged in a spatial heterodyne. As this is a conceptual drawing, the dimensions of waveguides 234 and telescope 230 are not to scale. For example, waveguides 234 may be smaller relative to telescope 230.

The interferometers may be configured to collect the samples with telescope 230. For example, each interferometer may independently collect light output by telescope 230. In some examples, to account for varying coupling efficiencies for each interferometer, multiple outputs may be collected from each interferometer. For example, the interferometers may be configured to collect samples in quadrature or in three-phase. For instance, each interferometer may be configured to collect two samples that are 180 degrees out of phase (e.g., in quadrature) and the two samples are normalized to generate a single sample to be processed by system 100. In some instances, each interferometer may be configured to three samples that are 120 degrees out of phase (e.g., in three-phase) and the three samples are normalized (e.g., averaged) to generate a single sample to be processed by system 100. For example, system 100 may determine a total intensity for an in-phase and intensity an out-of-phase intensity, and divide a result of subtracting the out-of-phase intensity from the in-phase intensity by the total intensity to determine a normalized intensity for the single sample as shown in the following equation.

$$y_{norm} = \frac{y_{in} - y_{out}}{y_{in} + y_{out}} \qquad \text{EQUATION 1}$$

where $y_{norm}$ is the normalized intensity for the single sample y, $y_{in}$ is the in-phase intensity, and $y_{out}$ is the out of phase intensity.

Figure 3:
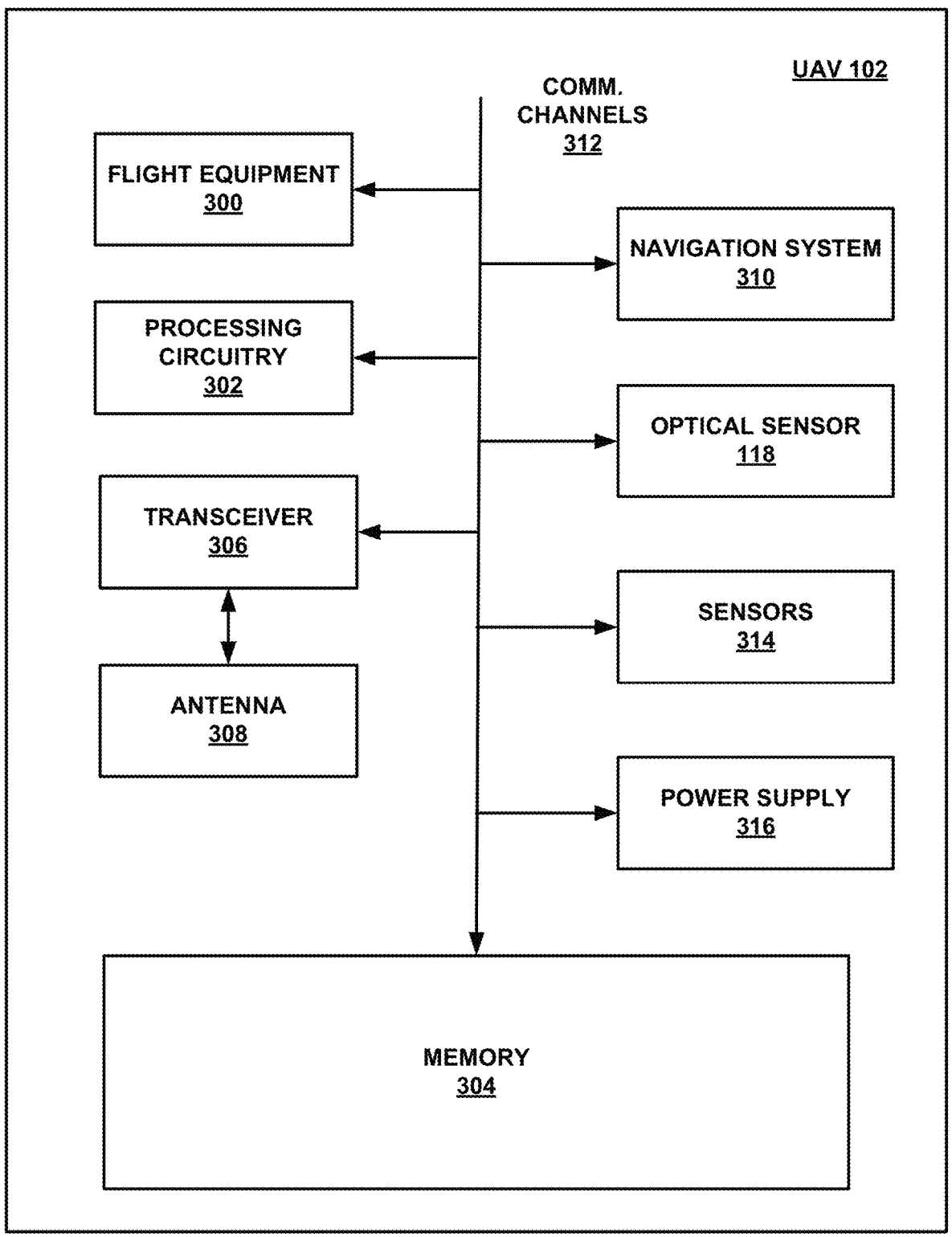
FIG. 3 is a block diagram illustrating example components of a UAV that may be used to implement techniques of this disclosure.

FIG. 3 is a block diagram illustrating example components of UAV 102 that may be used to implement techniques of this disclosure. UAV 102 includes flight equipment 300, processing circuitry 302, memory 304, transceiver 306, antenna 308, navigation system 310, optical sensor 118, sensor 314, and power supply 316. Communication channels 312 interconnect each of flight equipment 300, processing circuitry 302, memory 304, transceiver 306, antenna 308, navigation system 310, optical sensor 318, sensor 314, and power supply 316 for inter-component communications (physically, communicatively, and/or operatively). In some examples, communication channels 312 include a system bus, a network connection, an inter-process communication data structure, or any other method for communicating data, including various types of wireless communication technologies. Power supply 316 may provide electrical energy to each of the other components of UAV 102. In some examples, power supply 316 is a battery.

Processing circuitry 302 is intended to represent all processing circuitry and all processing capabilities of UAV 102. Processing circuitry 302 may, for example, include one or more digital signal processors (DSPs), general purpose microprocessors, integrated circuits (ICs) or a set of ICs (e.g., a chip set), application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein.

Memory 304 is intended to represent all of the various memory devices within UAV 102. Memory 304 constitutes a computer-readable storage medium and may take the form of either a volatile memory that does not maintain stored contents once UAV 102 is turned off or a non-volatile memory that stores contents for longer periods of time, including periods of time when UAV 102 is an unpowered state. Examples of volatile memories include random access memories (RAM), dynamic random access memories (DRAM), static random access memories (SRAM), integrated random access memory (IRAM), thyristor random access memory (TRAM), zero-capacitor random access memory (ZRAM), or any other type of suitable volatile memory. Examples of non-volatile memory include optical disk drives, magnetic disk drives, flash memory, read only memory (ROM), forms of electrically programmable memories (EPROM) or electrically erasable and programmable memories (EEPROM), or any other such type of non-volatile memory.

The functionality of UAV 102 is implemented by hardware, software, firmware, or combinations thereof. Memory 304 may store software and firmware that include sets of instructions. Processing circuitry 302 and, other hardware components of UAV 102, may execute the instructions to perform the techniques of this disclosure.

Transceiver 306 is configured to send and receive data using antenna 308. Transceiver 306 may send and receive data according to any of the wireless communication protocols described elsewhere in this disclosure. For example, transceiver 306 may be configured to receive navigation instructions. Additionally, transceiver 306 may be configured to send images and other data to a computing system, such as controller device 104 (FIG. 1), mobile device 106, or computing devices 110 (FIG. 1).

Navigation system 310 controls a flight path of UAV 102. For example, navigation system 310 may output signals to flight equipment 300 to instruct UAV 102 to fly to predetermined image capture locations, to land, or to otherwise navigate to locations along a flight path of UAV 102.

Sensor 314 are intended to represent all the various sensors included in UAV 102. UAV 102 may, for example, include one or more sensors used for flight management, such as accelerometers, gyroscopes, magnetometers, barometers, GNSS sensors, tilt sensors, inertial measurement sensors, speed sensors, and others.

Figure 4:
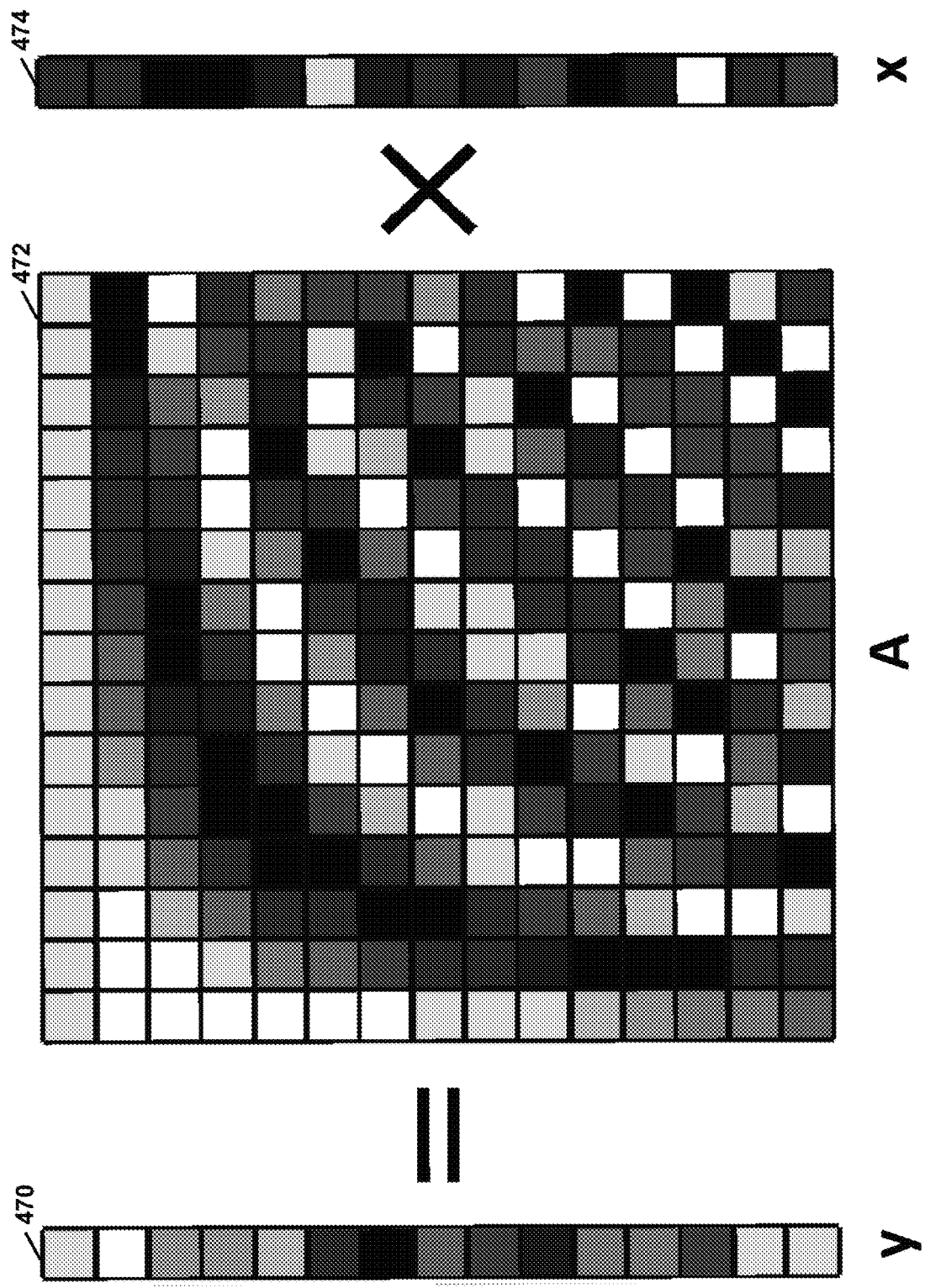
FIG. 4 is a conception diagram illustrating an example calibration matrix that may be used to implement techniques of this disclosure.

FIG. 4 is a conception diagram illustrating an example calibration matrix 472 that may be used to implement techniques of this disclosure. In the example of FIG. 4, interferometers 240 optically multiply spectrum information 474 ("x") by calibration matrix 472 ("A") to generate samples 470 ("y"). For example, calibration matrix 472 is a characteristic of the interferometers.

For example, the interferometers may be manufactured to comprise calibration matrix 472 such that the interferometers capture spectral information 474 of each element in the sensor and output samples 470. Each row of calibration matrix 472 represents one interferometer and each column of calibration matrix 472 represents a spectral response of each interferometer of interferometers 240. In the example of FIG. 4, the interferometers may be arranged in an order of frequency, where an interferometer with a lowest frequency response for interferometers 240 is arranged on a top of calibration matrix 472 and an interferometer with a highest frequency response is arranged at a bottom of calibration matrix 472. Calibration matrix 472 may be determined once for the interferometers, for example, using the process described in FIG. 6. For instance, processing circuitry may determine calibration matrix 472 using known spectral information and samples generated by the interferometers in response the known spectral information.

To determine spectrum information 474, processing circuitry 302 may apply a forward Fourier-transform by the following equation.

$$x = A^{-1} y \qquad \text{EQUATION 2}$$

For example, optical sensor 118 may collect samples 470. Processing circuitry 302 may generate a digitized signal representing samples 470. Processing circuitry 302 may apply a forward Fourier-transform using the inverse of calibration matrix 472 (e.g., $A^{-1}$) on the digitized signal to generate spectrum information 474 for the interferometers. In some examples, processing circuitry 302 may store the inverse of calibration matrix 472 (e.g., $A^{-1}$). In this way, processing circuitry 302 may apply a forward Fourier-transform by multiplying the digitized signal representing samples 470 with calibration matrix 472 to generate spectrum information 474.

Figure 5:
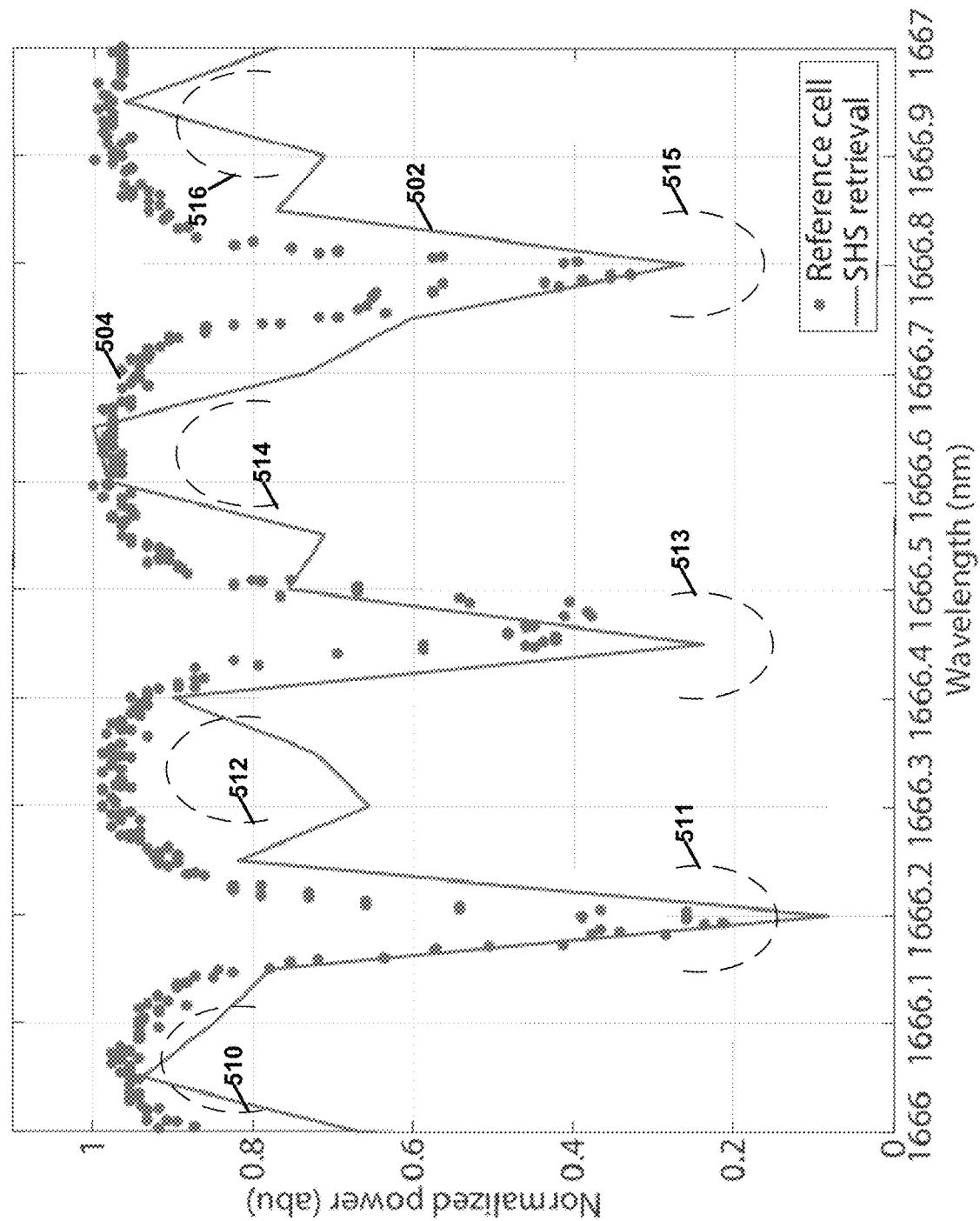
FIG. 5 is a graph illustrating example absorption features that may be used to implement techniques of this disclosure.

Processing circuitry 302 may generate one or more intensity of absorption features corresponding to the gas species from the spectrum information as shown in FIG. 5. While processing circuitry 302 of UAV 102 is used to process collected samples, in some examples one or more of controller device 104, mobile device 106, computing device 110, alert system 108, or another device of system 100 may also process collected samples with UAV 102 or may process collected samples instead of UAV 102.

FIG. 5 is a graph illustrating example absorption features that may be used to implement techniques of this disclosure. The abscissa axis (e.g., horizontal axis) of FIG. 5 represents wavelength and the ordinate axis (e.g., vertical axis) of FIG. 5 represents an intensity of light for spectrum information 502 generated by system 100 and spectrum information 504 for an example gas species (e.g., methane). System 100 may determine intensity of absorption features 510-516 from spectrum information 504. For example, system 100 may perform a least square fit or linear approximation to a Beer-Lambert absorption law on spectrum information 504 to determine the quantity of absorbing species (gas) seen by the sensor 510-516.

In response to determining absorption features 510-516 correspond to (e.g., match) absorption features 504 for an example gas species, system 100 determines that the gas species has been detected. In some examples, system 100 may determine a quantity of the gas species using the depth of absorption features 510-516. For instance, system 100 may determine a quantity of the gas species using the depth of absorption features 510-516 relative to non-absorbing regions of spectrum to estimate the quantity of absorbing material, for instance in a Beer-Lambert model.

FIG. 6 is a conception diagram illustrating example calibration scheme to generate a calibration matrix, in accordance with a technique of this disclosure. As shown, laser source 660 generates light (e.g., a laser) to a chip 264. In this way, the calibration scheme of FIG. 6 may use laser source 660 (e.g., a narrowband laser source) to generate calibration matrix 472. More specifically, for example, processing circuitry may be configured to drive laser source 560 to output a wavelength that isolates a single row of calibration matrix 472. In this example, camera 662 captures the output of chip 264 for each wavelength output by the laser across the spectral range (x) to build up the entire calibration matrix 472 row by row.

Figure 7:
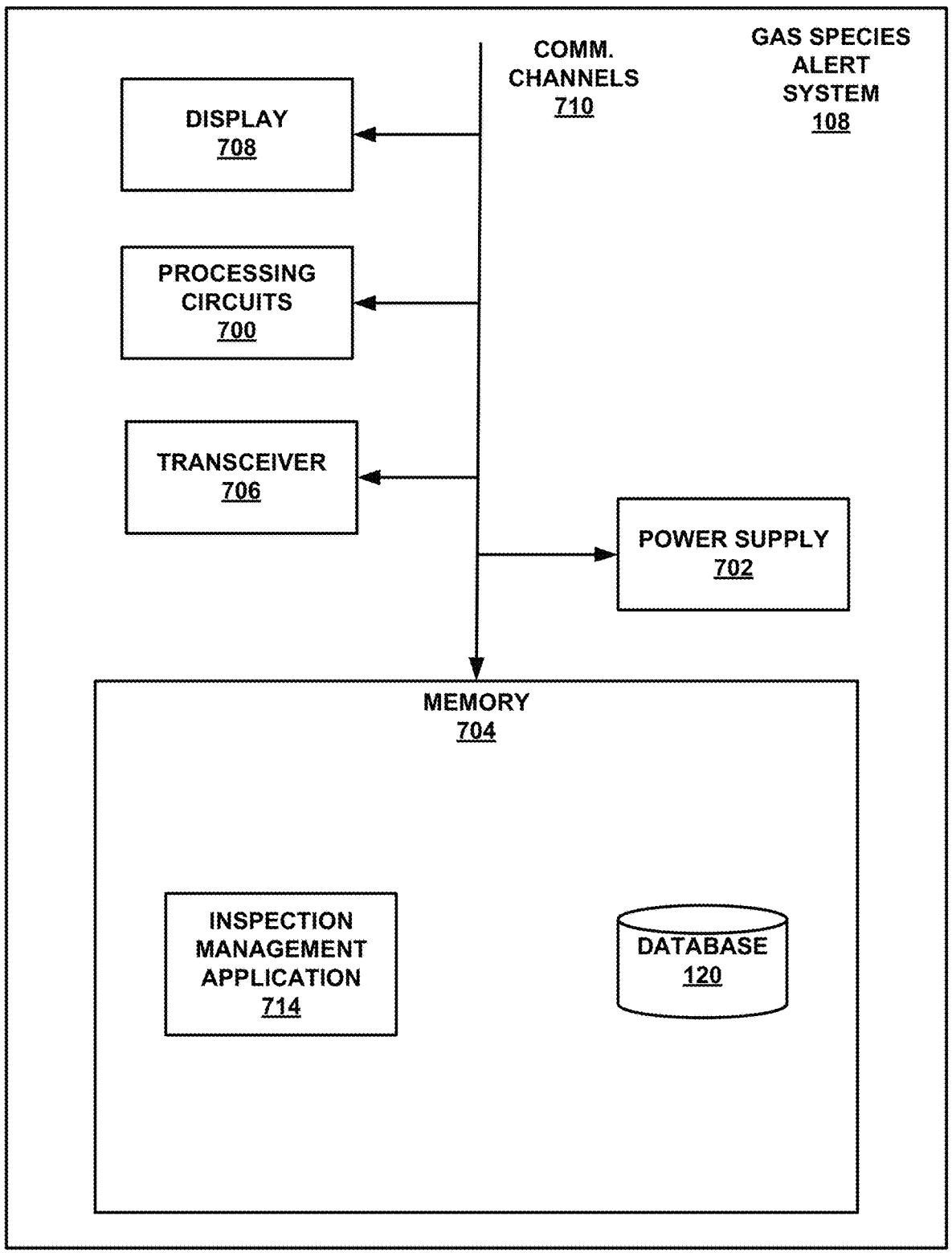
FIG. 7 is a block diagram illustrating example components of a gas species alert system, in accordance with a technique of this disclosure.

FIG. 7 is a block diagram illustrating example components of a gas species alert system 108, in accordance with a technique of this disclosure. In the example of FIG. 7, alert system 108 includes one or more processing circuits 700, a power supply 702, a memory 704, a transceiver 706, a display 708. Communication channels 710 interconnect processing circuits 700 (also referred to herein as "processing circuitry"), memory 704, transceiver 706, and display 708. Power supply 702 provides power to processing circuits 700, memory 704, transceiver 706 and display 708. Processing circuits 700 and memory 704 and may be implemented in a manner similar to processing circuitry 302 and memory 304 described above with respect to FIG. 3. Transceiver 706 may comprise a network card, such as an Ethernet adaptor, wireless interface, or other device for sending and receiving data with other computing devices. Display 708 may comprise various types of displays for outputting data, such as liquid crystal displays, plasma displays, light emitting diode (LED) displays, and so on. In other examples, alert system 108 may include more, fewer, or different components. For instance, in some examples, alert system 108 does not include display 708.

In the example of FIG. 7, memory 704 stores database 120 and a gas species alert application 714. Database 120 stores data associated with gas detection projects, as described elsewhere in this disclosure. For instance, database 120 may comprise tables and data associated with a calibration matrix, samples, digitized signals, spectrum information, absorption features, quantities of a gas species detected, and so on. Gas species alert application 714 may comprise software instructions that, when executed by processing circuits 700, cause alert system 108 to perform the automatic processing of samples to determine whether a gas species has been detected as described in this disclosure.

Figure 8:
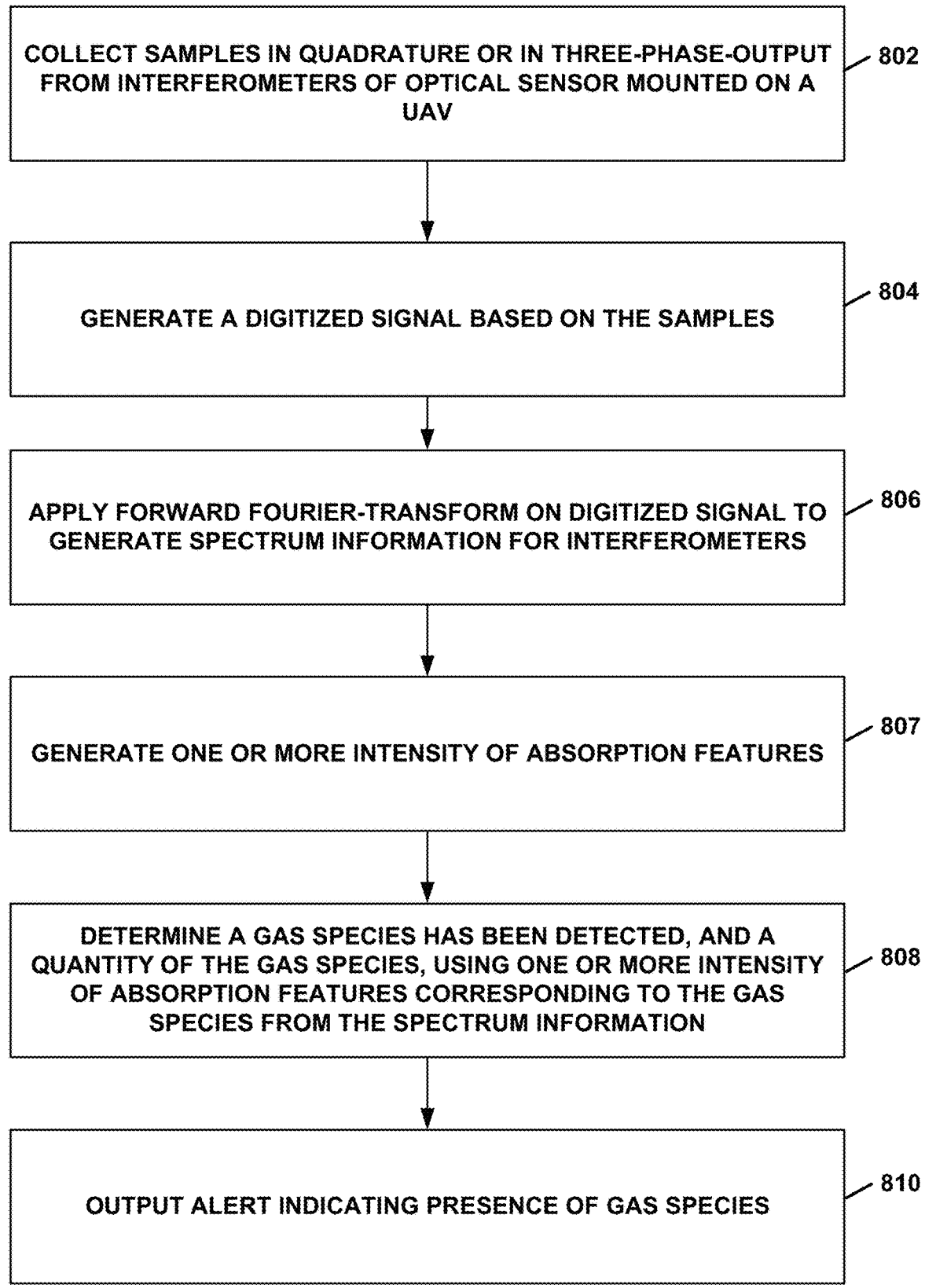
FIG. 8 is a flowchart illustrating an example process for detecting trace-gas, in accordance with a technique of this disclosure.

FIG. 8 is a flowchart illustrating an example process for detecting trace-gas, in accordance with a technique of this disclosure. FIG. 8 is discussed with reference to FIGS. 1-7 for example purposes only. Optical sensor 118 collects samples in quadrature (e.g., 180 degrees out of phase) or in three-phase-output (e.g., 120 degrees out of phase) from interferometers of an optical sensor mounted on a UAV 102 (802). In some examples, processing circuitry 302 and/or processing circuits 700 may normalize the samples. For example, processing circuitry 302 and/or processing circuits 700 may normalize the samples by taking an average of the collected samples in quadrature (e.g., 180 degrees out of phase) or in three-phase-output (e.g., 120 degrees out of phase).

In some examples, telescope 230 has a numerical aperture that corresponds to the interferometers. For example, telescope 230 is matched to waveguide NA when a focus and a diameter of telescope 230 designed such that $\sin(\theta)=D/(2x)$. Processing circuitry 302 and/or processing circuits 700 generate a digitized signal based on the samples (804). Processing circuitry 302 and/or processing circuits 700 applies a forward Fourier-transform on the digitized signal to generate spectrum information for the plurality of interferometers (806).

Processing circuitry 302 and/or processing circuits 700 may generate one or more intensity of absorption features. For example, processing circuitry 302 and/or processing circuits 700 may apply Beer lambert law to generate a spectrum with absorption features at a specific depth corresponding to an amount of gas seen by the optical sensor 118. In this example, processing circuitry 302 and/or processing circuits 700 may perform a least squares fit by finding the amount of gas that produces a theoretical spectrum with the most similar absorption features to the measured spectrum.

Figure 9:
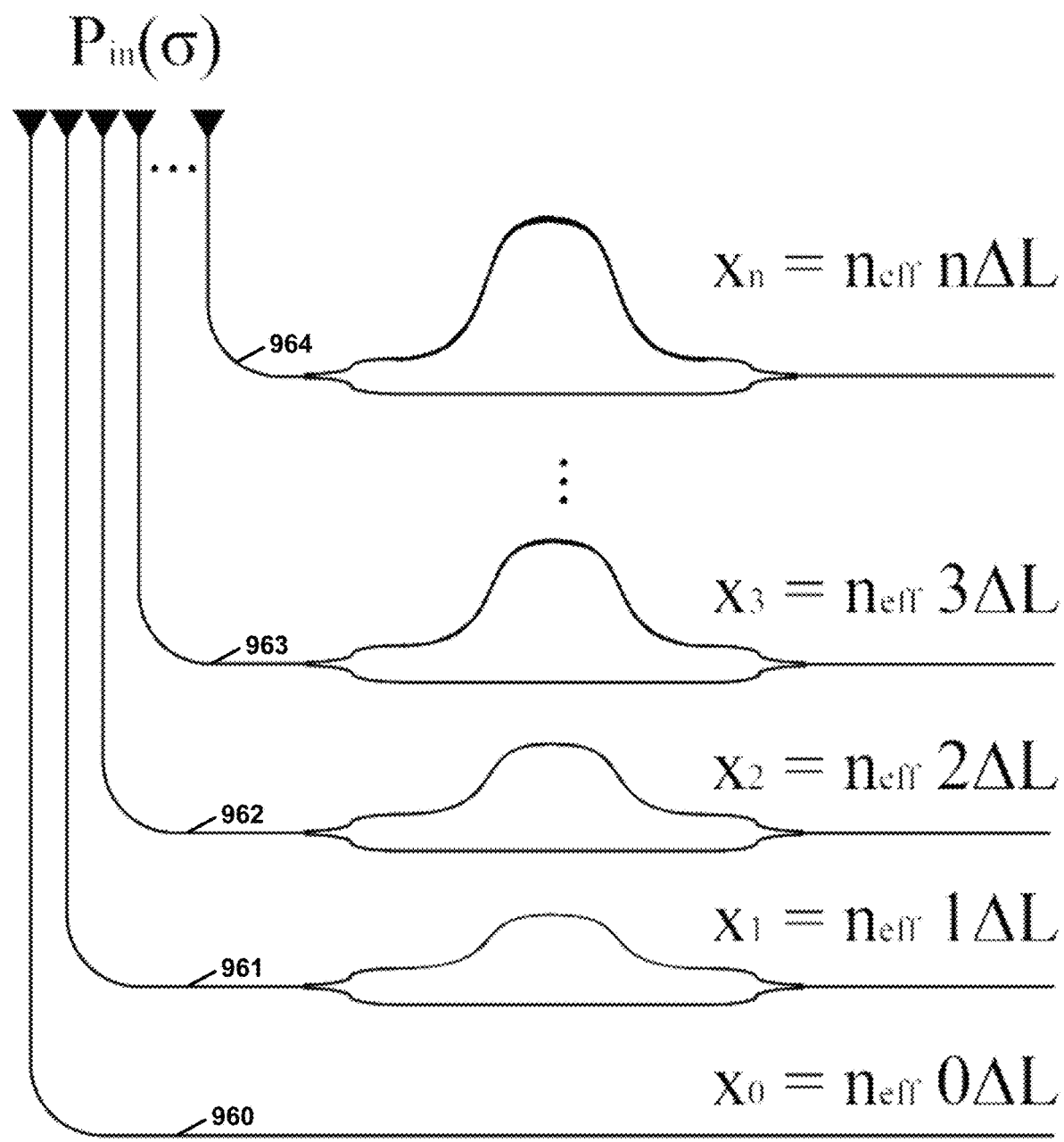
FIG. 9 is a conception diagram illustrating first example interferometers, in accordance with a technique of this disclosure.

Processing circuitry 302 and/or processing circuits 700 may determine a gas species has been detected, and a quantity of the gas species, using one or more intensity of absorption features corresponding to the gas species from the spectrum information (808). Processing circuitry 302 and/or processing circuits 700 output an alert indicating a presence of the detected gas species (810). For instance, FIG. 9 is a conception diagram illustrating first example interferometers, in accordance with a technique of this disclosure. As shown, interferometers 960, 961, 962, 963, and 964 have optical path lengths in linearly increasing multiples of a common physical path increment $\Delta L$; the optical path increments are given by $X_0=n_{eff}0\Delta$, $X_1=n_{eff}1\Delta L$, $X_2=n_{eff}2\Delta L$, $X_3=n_{eff}3\Delta L$, and $X_n=n_{eff}n\Delta L$, respectively.

Figure 10:
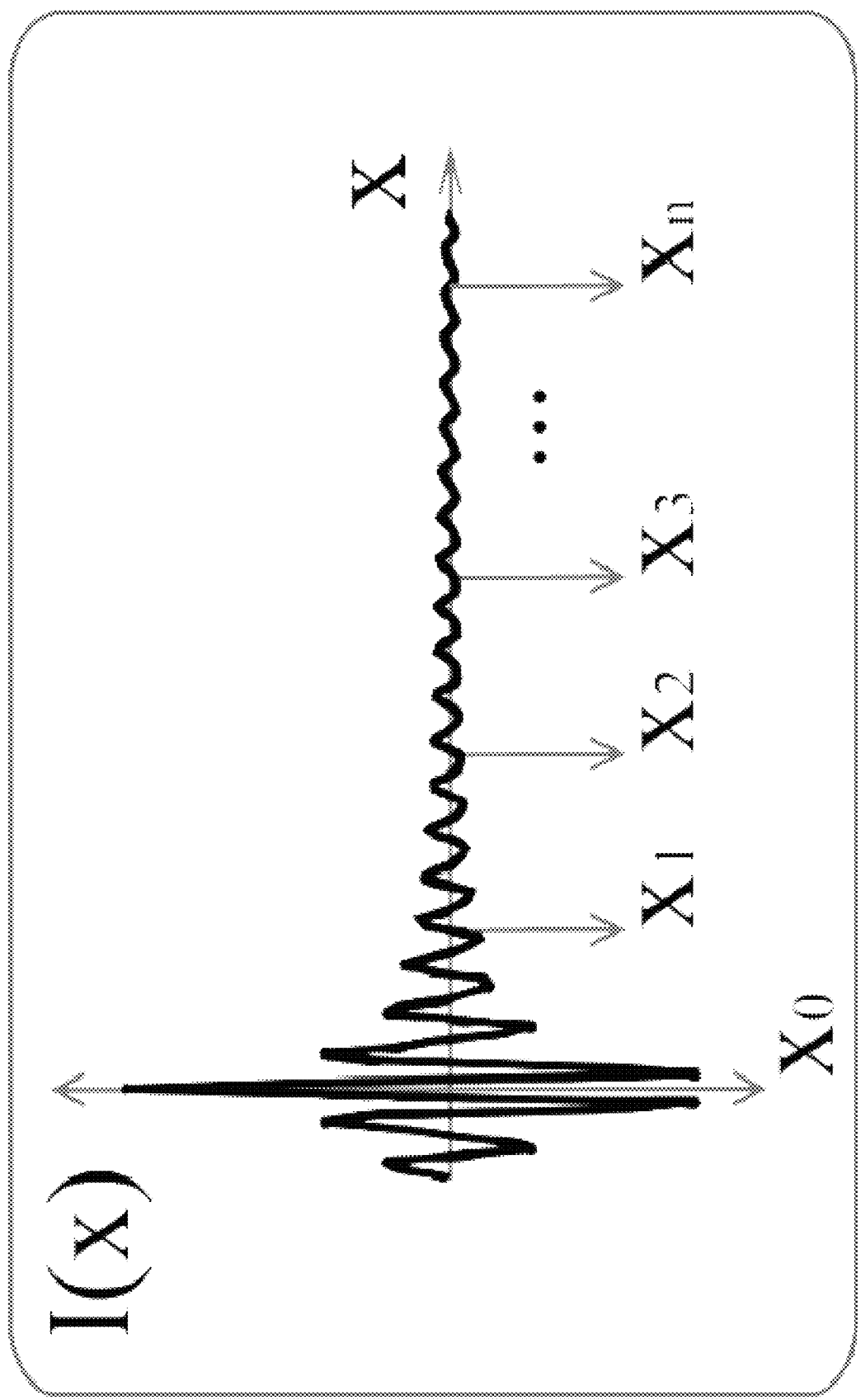
FIG. 10 is a conception diagram illustrating a digitalized signal output by the first example interferometers of FIG. 9, in accordance with a technique of this disclosure.

FIG. 10 is a conception diagram illustrating a digitalized signal ($X_0$, $X_1$, $X_2$, $X_3$, $X_n$) output by the first example interferometers 960, 961, 962, 963, and 964 of FIG. 9, in accordance with a technique of this disclosure. The abscissa axis (e.g., horizontal axis) of FIG. 10 represents optical path delay of an arbitrary interferometer, and the ordinate axis (e.g., vertical axis) of FIG. 10 represents an intensity of an analog signal received by interferometer 960, 961, 962, 963, and 964. Specifically, interferometer 960 generates digitized signal $X_0$, interferometer 961 generates digitized signal $X_1$, interferometer 962 generates digitized signal $X_2$, interferometer 963 generates digitized signal $X_3$, and interferometer 964 generates digitized signal $X_n$.

Figure 11:
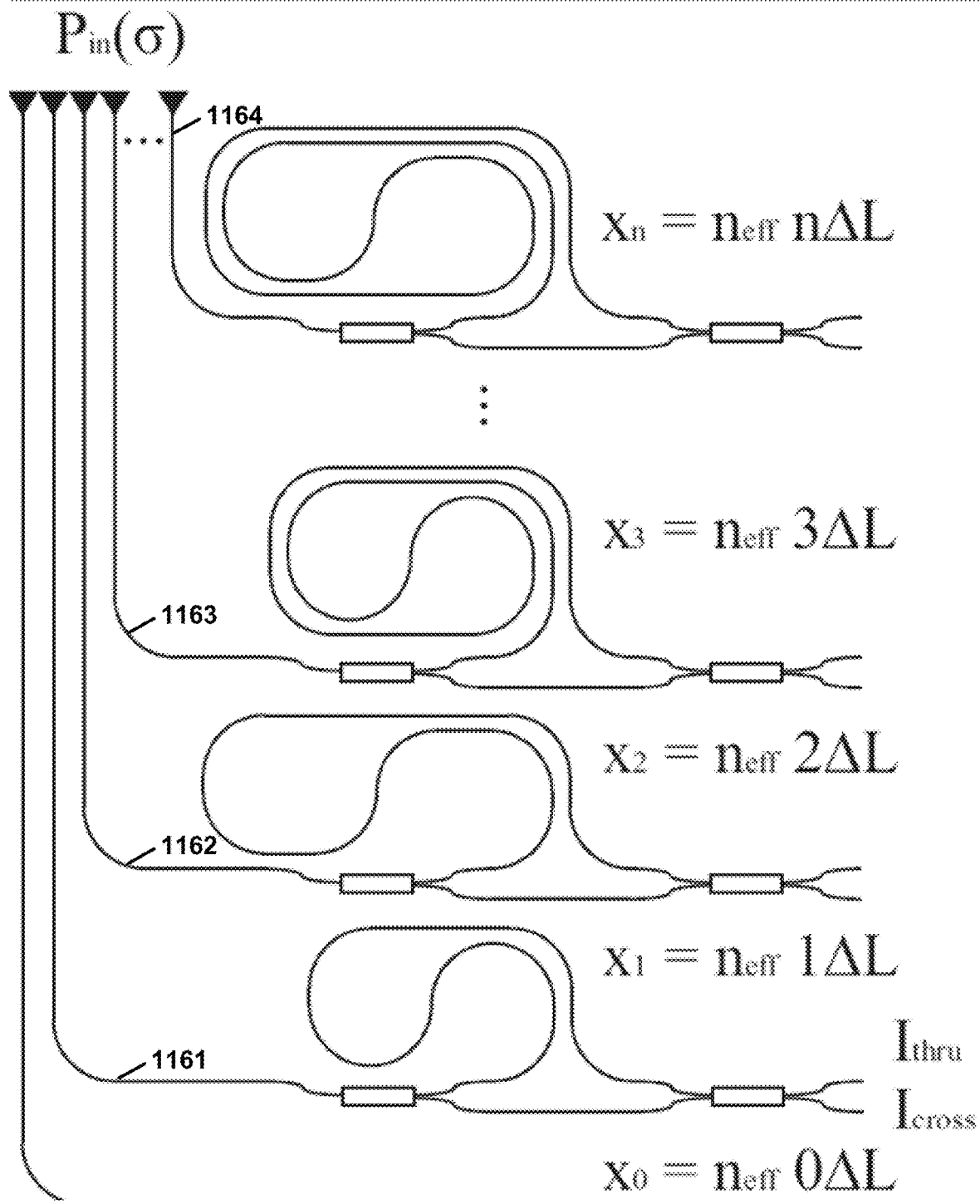
FIG. 11 is a conception diagram illustrating second example interferometers, in accordance with a technique of this disclosure.

FIG. 11 is a conception diagram illustrating second example interferometers, in accordance with a technique of this disclosure. As shown, interferometers 1161, 1162, 1163, and 1164 have responses $X_1=n_{eff}1\Delta L$, $X_2=n_{eff}2\Delta L$, and $X_3=n_{eff}3\Delta L$, $X_n=n_{eff}n\Delta L$, respectively. In this example, each interferometer produces two outputs corresponding to the afore-mentioned technique of sampling in quadrature. The two outputs of these interferometer (in-phase and out-of-phase) are generated using multi-mode interference couplers and may be used to produce a normalized signal as described in Equation 1.

Figure 12:
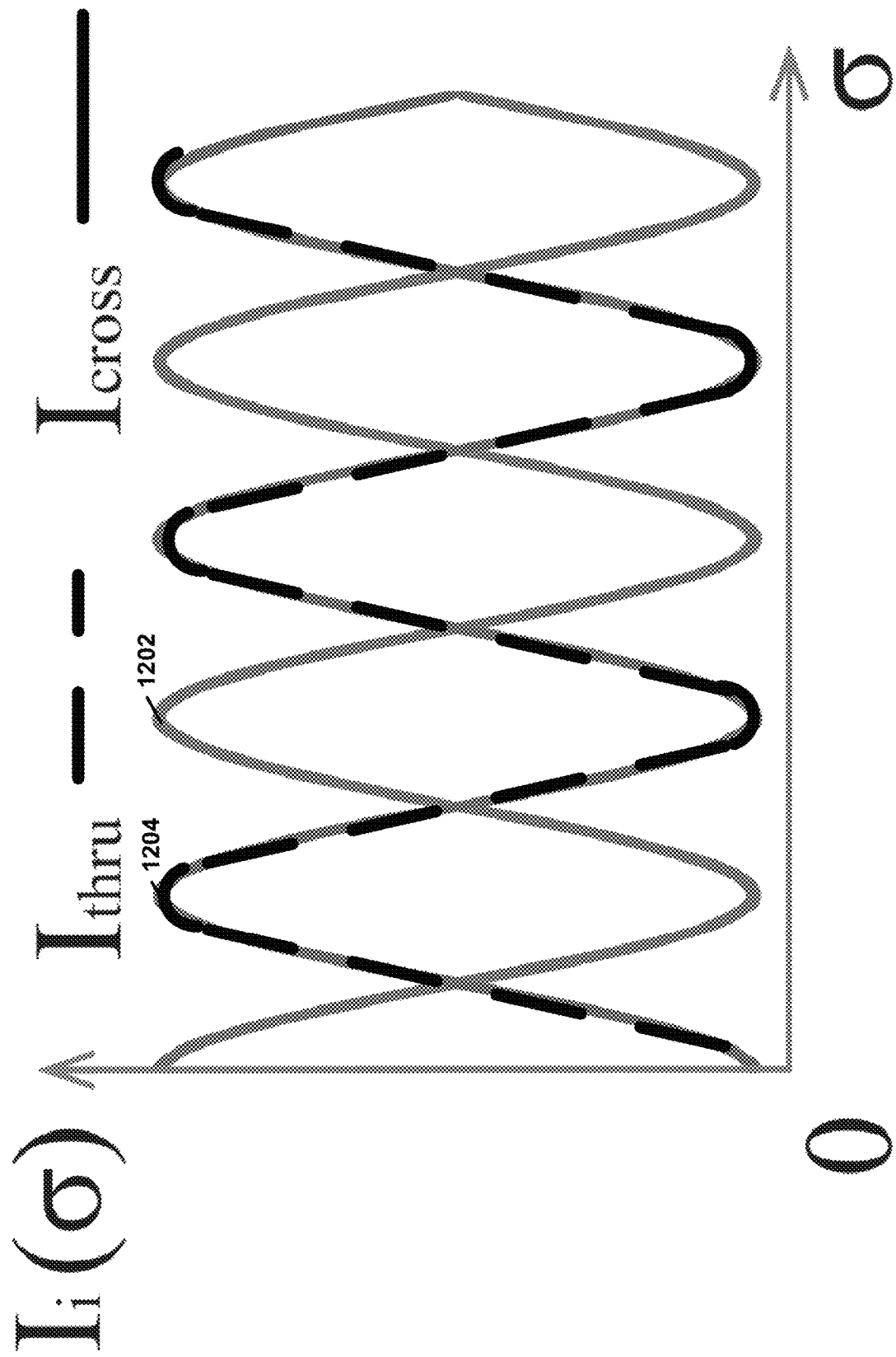
FIG. 12 is a conception diagram illustrating an in-phase sample and an out-of-phase sample, in accordance with a technique of this disclosure.

FIG. 12 is a conception diagram illustrating an in-phase sample 1202 and an out-of-phase sample 1204, in accordance with a technique of this disclosure. For example, optical sensor 118 may collect the samples from the plurality of interferometers in quadrature (e.g., 180 degrees out-of-phase) in order to normalize the sampling points and correct for non-uniform illumination of an aperture, as well as phase shifts in each interferometer.

While the techniques of this disclosure will be described with respect to a UAV for purposes of explanation, it should be understood that the techniques of this disclosure may be implemented by other types of vehicles, including various types of land-based vehicles, water-based vehicles, space vehicles, and other types of aerial vehicles.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Cloud technology used to automatically save the images on web server is not limited to local or global internet cloud. It can be a private and/or public cloud which is protected by the user ID and passwords. The passwords may not limit to one or two.

Various examples have been described. These and other examples are within the scope of the following claims.

What is claimed is:

1. A system for detecting trace-gas, the system comprising:
    an optical sensor mounted on a vehicle, the optical sensor comprising a plurality of interferometers configured to collect samples; and
    processing circuitry configured to:
        generate a digitized signal based on the samples;
        apply, using a calibration matrix determined using known spectral information and samples generated by the plurality of interferometers in response the known spectral information, a forward Fourier-transform on the digitized signal to generate spectrum information for the plurality of interferometers, wherein, to apply the forward Fourier-transform, the processing circuitry is configured to multiply the digitized signal and an inverse of the calibration matrix and wherein each row of the calibration matrix represents a respective interferometer of the plurality of interferometers; and
        determine a gas species has been detected using one or more intensity of absorption features of the spectrum information corresponding to the gas species from the spectrum information.

2. The system of claim 1, wherein, to collect samples, the plurality of interferometers is configured to collect samples in quadrature or in three-phase.

3. The system of claim 1, wherein the optical sensor comprises a telescope configured with a numerical aperture that corresponds to a numerical aperture of the plurality of interferometers and wherein the plurality of interferometers is configured to collect the samples with the telescope.

4. The system of claim 1, wherein, to determine the gas species, the processing circuitry is configured to determine a quantity of the gas species.

5. The system of claim 1, wherein the plurality of interferometers is arranged in a first chip of a plurality of chips arranged in a stacked configuration.

6. The system of claim 5, wherein each chip of the plurality of chips is configured for detecting a respective gas species of a plurality of gas species.

7. The system of claim 6, wherein the plurality of gas species comprises one or more of water vapor, Methane, Hydrogen Sulfide, Carbon Monoxide, Carbon Dioxide, Phosphene, Benzene, an Oxide of Nitrogen, or a Sulphur oxide.

8. The system of claim 1, wherein the optical sensor is configured to collect the samples at a standoff distance of at least one meter from the gas species.

9. The system of claim 1, wherein each sample specifies a geo-location tag to provide a 3D map of trace-gas concentrations.

10. The system of claim 1, wherein the optical sensor is configured to operate in infrared.

11. The system of claim 1, wherein the vehicle is an Unmanned Aerial Vehicle (UAV).

12. The system of claim 1,
wherein the processing circuitry is arranged within the vehicle;
wherein the processing circuitry is arranged outside of the vehicle; or
wherein the processing circuitry comprises a first processor arranged within the vehicle and a second processor arranged outside of the vehicle.

13. A method of detecting trace-gas, the method comprising:
collecting, by a plurality of interferometers, samples from a plurality of interferometers of an optical sensor mounted on a vehicle;
generating, by processing circuitry, a digitized signal based on the samples;
applying, by the processing circuitry, using a calibration matrix determined using known spectral information and samples generated by the plurality of interferometers in response the known spectral information, a forward Fourier-transform on the digitized signal to generate spectrum information for the plurality of interferometers, wherein applying the forward Fourier-transform comprises multiplying the digitized signal and an inverse of the calibration matrix and wherein each row of the calibration matrix represents a respective interferometer of the plurality of interferometers; and
determining, by the processing circuitry, a gas species has been detected using one or more intensity of absorption features of the spectrum information corresponding to the gas species from the spectrum information.

14. The method of claim 13, wherein collecting samples comprises collecting samples in quadrature or in three-phase.

15. The method of claim 13, wherein the optical sensor comprises a telescope configured with a numerical aperture that corresponds to a numerical aperture of the plurality of interferometers and collecting the samples is with the telescope.

16. The method of claim 13, wherein determining the gas species comprises determining a quantity of the gas species.

17. The method of claim 13, wherein the vehicle is an Unmanned Aerial Vehicle (UAV).

18. The method of claim 13,
wherein the processing circuitry is arranged within the vehicle;
wherein the processing circuitry is arranged outside of the vehicle; or
wherein the processing circuitry comprises a first processor arranged within the vehicle and a second processor arranged outside of the vehicle.

19. A system for detecting trace-gas, the system comprising:
an Unmanned Aerial Vehicle (UAV) comprising an optical sensor mounted on the UAV, the optical sensor comprising a plurality of interferometers configured to collect samples; and
processing circuitry configured to:
generate a digitized signal based on the samples;
apply, using a calibration matrix determined using known spectral information and samples generated by the plurality of interferometers in response the known spectral information, a forward Fourier-transform on the digitized signal to generate spectrum information for the plurality of interferometers, wherein, to apply the forward Fourier-transform, the processing circuitry is configured to multiply the digitized signal and an inverse of the calibration matrix and wherein each row of the calibration matrix represents a respective interferometer of the plurality of interferometers; and
determine a gas species has been detected using one or more intensity of absorption features of the spectrum information corresponding to the gas species from the spectrum information.

20. The system of claim 19,
wherein the processing circuitry is arranged within the UAV;
wherein the processing circuitry is arranged outside of the UAV; or
wherein the processing circuitry comprises a first processor arranged within the UAV and a second processor arranged outside of the UAV.

* * * * *